(12) United States Patent

Mehendale et al.

(10) Patent No.: US 7,843,306 B2
(45) Date of Patent: Nov. 30, 2010

(54) TRANSFORMER CORE

(75) Inventors: Aditya Mehendale, Ruurlo (NL);
Wouter Hagedoorn, Hengelo (NL);
Joost Lotters, Ruurlo (NL)

(73) Assignee: Berkin B.V., Ruurlo (NL)

( * ) Notice: Subject to any disclaimer, the term of this patent is extended or adjusted under 35 U.S.C. 154(b) by 0 days.

(21) Appl. No.: 12/117,050

(22) Filed: May 8, 2008

(65) Prior Publication Data

US 2008/0290982 A1 Nov. 27, 2008

(30) Foreign Application Priority Data

May 24, 2007 (NL) .................................. 1033887

(51) Int. Cl.
*H01F 27/24* (2006.01)
*H01F 17/04* (2006.01)
(52) U.S. Cl. ................. 336/216; 336/217; 336/234; 336/211; 336/221
(58) Field of Classification Search .................... None
See application file for complete search history.

(56) References Cited

U.S. PATENT DOCUMENTS 2,467,867 A * 4/1949 Somerville .................. 336/212
2,942,218 A * 6/1960 Attewell ..................... 336/217
3,513,423 A * 5/1970 Russell ....................... 336/211
3,918,153 A * 11/1975 Burkhardt et al. ............ 29/609
4,520,556 A * 6/1985 Pasko et al. .................. 29/606
6,070,317 A * 6/2000 Allen et al. .................. 29/609
2002/0067239 A1* 6/2002 Nathasingh et al. ......... 336/234

FOREIGN PATENT DOCUMENTS

| DE | 7342490 | 5/1974 |
| DE | 4410160 | 10/1995 |
| GB | 680677 | 10/1952 |

OTHER PUBLICATIONS

Search Report and Written Opinion dated Dec. 17, 2007.

* cited by examiner

*Primary Examiner*—Anh T. Mai
*Assistant Examiner*—Mangtin Lian
(74) *Attorney, Agent, or Firm*—Young & Thompson

(57) ABSTRACT

A transformer core includes a stack of a plurality of planar core plates of a magnetically permeable material, which plates each consist of a first and a second sub-part that together enclose at least one opening. The sub-parts can be fitted together via contact faces that are located on either side of the opening and that extend obliquely with respect to the centerline of the core plate. The invention also relates to the use of the described transformer core in a Coriolis flowmeter with the Coriolis tube extending through the opening so as to induce a current in the tube.

4 Claims, 5 Drawing Sheets

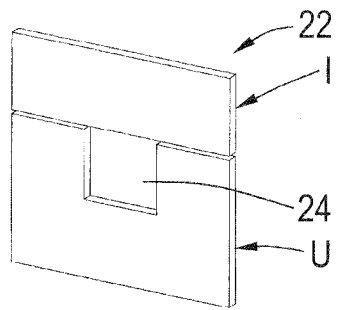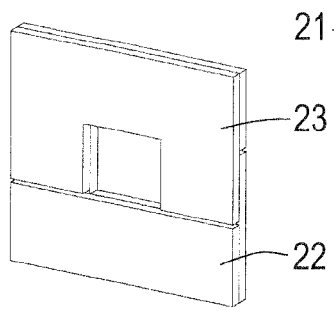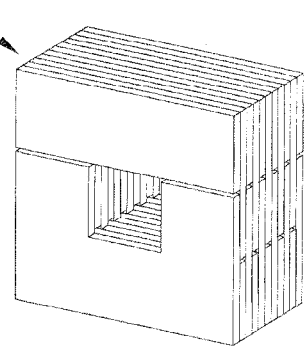
Fig.1A　　　　Fig.1B　　　　Fig.1C
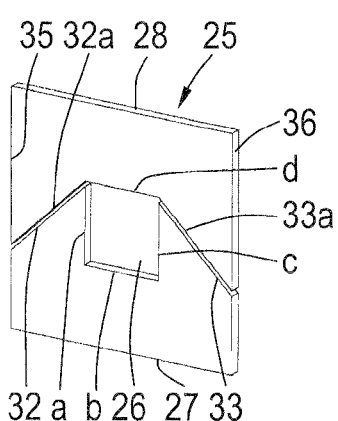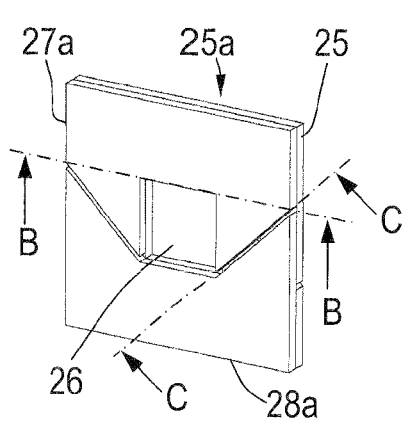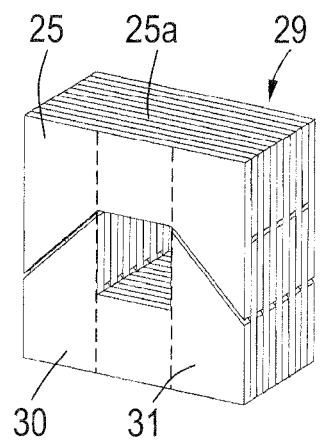
Fig.2A　　　　Fig.2B　　　　Fig.2C
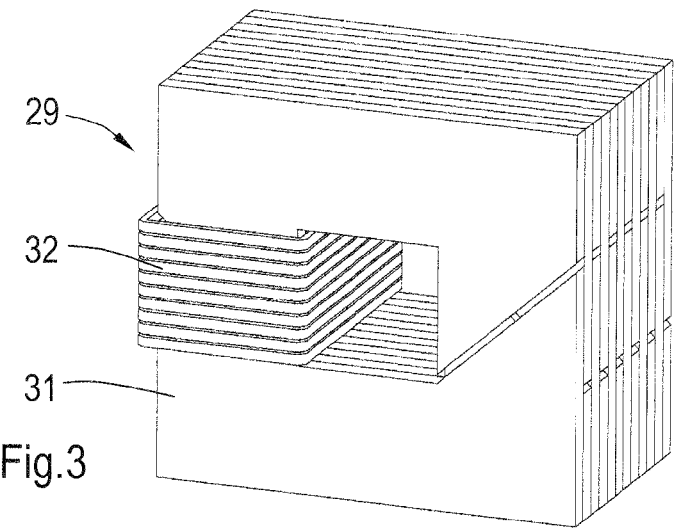
Fig.3

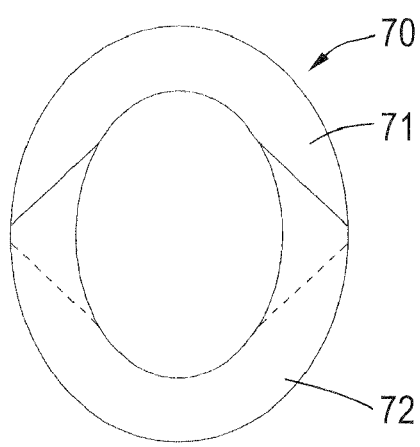
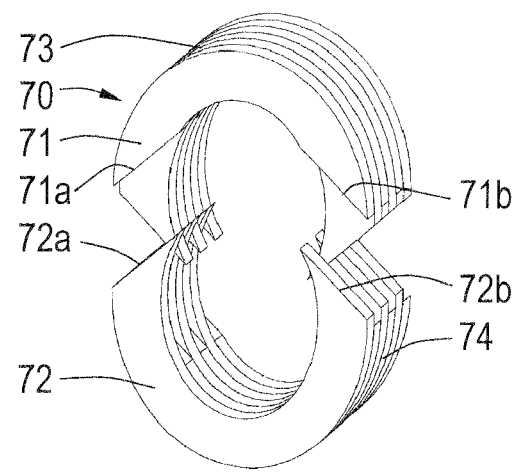
Fig.12A
Fig.12B
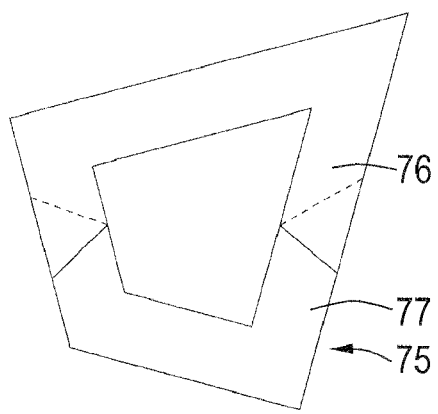
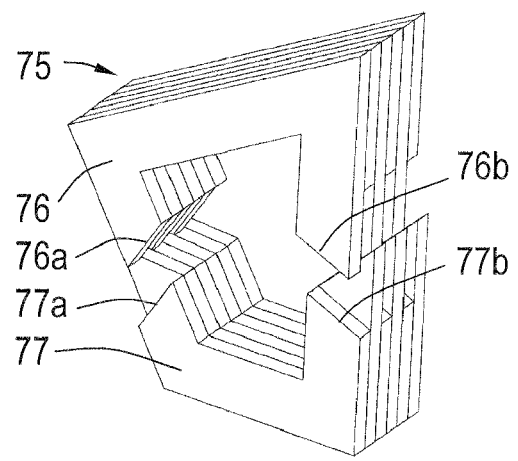
Fig.13A
Fig.13B
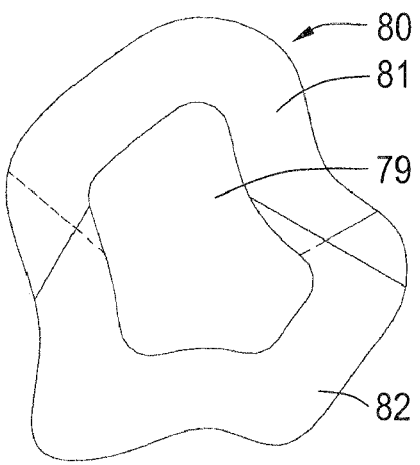
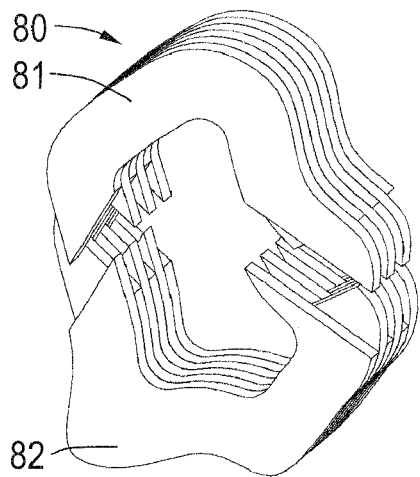
Fig.14A
Fig.14B

TRANSFORMER CORE

The invention relates to a transformer core, which core comprises a stack of a plurality of plate-shaped core parts (or core laminations) of a magnetically permeable material which each consist of a first and second sub-part that together enclose at least one opening.

Building-up a transformer core from stacked plates of a soft-magnetic (or magnetically permeable) material is a usual technique for manufacturing transformers. The object is to minimize stray fields within the transformer core, or to achieve that the field lines run round in parallel and eddy currents are minimized.

The present method of building a transformer is to stack U-shaped and I-shaped plate parts in alternation. The U-parts are inserted into an electric coil from alternating sides during the assembling process.

A main disadvantage of the present method is that the parts are never perfectly joined together, so that an air gap arises between the mutually facing surfaces at the end of the U and the side of the I. Only half the diameter is effectively available in that location as a result. This diameter determines the saturation flux through the entire transformer core.

Another conventional technique is to stack the U- and I-plates all in the same manner, to grind the contact faces, and finally to join these together with fastening means. This is more labor-intensive and accordingly more expensive.

It is an object of the invention to solve at least one of the problems mentioned above. The transformer core according to the invention is for this purpose characterized in that the sub-parts of each core part bear on each other with first and second contact faces that lie on either side of the opening and that extend obliquely relative to the centerline of the core plate.

An embodiment of the invention relates to a so-termed oblique division of the core laminations into two sub-parts, the core laminations being stacked alternately. The two sub-parts must be contraform, i.e. having mutually matching shapes. They may be identical or mutually different.

A first advantage of an oblique division is: a larger minimum diameter. FIG. 2b shows a line B-B representing a division along a perpendicular diameter and a line C-C representing a division along an oblique diameter. In the latter case the diameter available for conducting the flux is in fact larger by approximately a factor of $\sqrt{2}$ (for an angle of division of 45°) than in the conventional construction with a perpendicular division of the core laminations.

A second advantage of an oblique division is: self-centering. An embodiment of the invention is characterized in that the contact faces situated on either side of the opening are oriented such that the first and the second sub-part are self-centering when being fitted together. The oblique division renders self-centering during joining together of the two core halves possible (FIG. 4).

A third advantage of an oblique division is: easier (dis-) assembly. The two halves of the transformer core, each consisting of a pack of alternately stacked sub-parts that are fastened to one another (for example by means of laser welding), can be pressed into one another and pulled apart again thanks to the oblique contact faces. This is convenient, for example, during mounting of the transformer core in a Coriolis flowmeter instrument, wherein the Coriolis tube is to be passed through the opening in the transformer core, because in that case the upper core half need not be mounted until after the vulnerable Coriolis tube has been placed in its housing. The two halves then fit clampingly into one another without additional fastening means.

In an embodiment, at least the first core part is U-shaped with two legs that each terminate in a contact face, said contact faces extending obliquely to the cross-section of the legs. Preferably, oblique contact faces are used that are at an angle of between 30° and 60°, in particular 45°, to the perpendicular ('smallest') diameter. This is a favorable embodiment of the more general form wherein there are two contraform plates with a division (straight or curved) whose length is substantially greater than the smallest diameter. Such a more complex shape can be readily realized by means of stamping or laser cutting.

The principle of oblique division is also applicable to a transformer core with two openings, also denoted a double-loop core, for current or voltage conversion, having core laminations usually consisting of E-shaped and I-shaped plates (sub-parts), cf. FIG. 6.

To obtain a good effect of the invention, it is important that the complementary contact faces of two adjoining core plates do not lie perpendicularly above one another. To comply with this, the complementary contact faces of adjoining core plates preferably lie in different planes. These planes may or may not cross each other in the area of the core plates, or they may be parallel, for example. A crossing design has the advantage that it results in a shorter clamping length of the core halves, which are accordingly easier to move into and out of each other, or can be more readily disassembled. The non-crossing design leads to a greater clamping length, which may be desirable in itself, subject to the dimensions or the operating conditions.

Preferred Application:

Lorentz excitation of Coriolis tube with indirect current supply through the tube.

Design: primary coil arranged around rectangular transformer core with opening through which Coriolis tube extends (FIG. 5).

Operation: excitation current through a primary coil generates field in transformer core; transformer core surrounds Coriolis tube=secondary winding of transformer; induction current is generated herein. This induction current in combination with the field of the magnet generates a Lorentz force.

Object: to maximize the generated field with a minimum constructional volume of the transformer core, i.e. as close as possible to the saturation field strength ("flux") of the core material. This material usually is a specific soft iron with a high saturation flux such as, for example, "Trafoperm" (trademark of the VAC company).

The invention accordingly also relates to a Coriolis flowmeter with a Coriolis tube, characterized in that the Coriolis tube is passed through the opening of at least one transformer core according to the invention, and in that a primary coil is wound around a portion of each core so as to induce a current in the Coriolis tube when the coil is energized.

The invention will be explained in more detail with reference to a few embodiments.

FIGS. 1a, b, c show the construction of a conventional transformer core;

FIGS. 2a, b, c show the construction of a transformer core according to the invention with one opening;

FIG. 3 shows a transformer core according to the invention provided with an electric coil;

FIGS. 4a, b show the two parts of an embodiment of transformer core according to the invention during the process of assembling together, FIG. 4a in perspective view and FIG. 4b in a diagrammatic front elevation;

FIG. 5 shows the combination of the transformer core and coil of FIG. 3 with a Coriolis tube; FIGS. 6a, b show a a transformer core according to the invention with two openings;

FIGS. 7a, b show two alternative components for a transformer core according to the invention;

FIG. 8 shows a flowmeter of the Coriolis type with two transformer cores according to the invention for inducing current in the Coriolis tube;

FIGS. 9, 10, and 11 show different embodiments of a transformer core according to the invention with parallel contact faces, contact faces lying in line with each other, and an asymmetrical division of the core plates, respectively; and FIGS. 12, 13, and 14 shows different embodiments of a transformer core according to the invention with core laminations having an oval shape, a quadrilateral shape, and a random irregular shape, respectively.

FIGS. 1a, b, c show the construction of a conventional transformer core (21) consisting of a stack of core laminations 22, 23 each comprising a U-shaped (U) and an I-shaped (I) sub-part, which sub-parts enclose a core opening 24 and bear on one another with contact faces that are perpendicular to two mutually facing walls of the core opening 24.

FIGS. 2a, b, c show the construction of a transformer core according to the invention.

FIG. 2a shows a first pair of two planar sub-parts 27, 28 of magnetically permeable material that are placed against each other and that together constitute a (rectangular, in this case square) core lamination 25 with a central (rectangular, in this case square) opening 26. The one sub-part 27 comprises three of the walls (a, b, c) of the opening, two of which (a and c) lie opposite one another, and oblique contact faces 32, 33 that extend from corners of the opening 26 to two mutually opposed side walls 35, 36 of the core lamination 25. The other sub-part 28 comprises the fourth wall (d) of the opening and has oblique contact faces 32a, 33a that extend from the corners of the fourth wall (d) of the opening 26 to said side walls 35, 36 of the core and that bear on the contact faces 32, 33 of the first sub-part 28.

A second pair of planar sub-parts 27a, 28a identical to the first pair and together forming a core lamination 25a is placed against the first pair parallel thereto but rotated through 180° with respect thereto (FIG. 2b). It is to be noted in this connection that the laminations are usually mutually separated by an electrically insulating (paint) coating. A number of first and second pairs in this alternating arrangement together form a transformer core 29 with two parallel 'legs' 30, 31 (FIG. 2c). After assembly one leg 31 of the core 29 is passed through an electric winding or coil (32 in FIG. 3).

The field lines in the magnet's core cross the air gaps formed between the contact faces at an oblique angle owing to the oblique orientation of the contact faces relative to the cross-section of the core part of which they form part. The idea of making the field lines cross at an oblique angle provides an improvement in comparison with the conventional transformer core, where the field lines cross the air gap formed between the contact surfaces perpendicularly (FIG. 1). An optimum angle would be an infinitely acute angle wherein the individual sub-parts interlock as pointed fingers. This, however, is not practical for reasons of manufacturing and assembling technology, which is why an angle of 45° was chosen, or more in general, an angle between 30° and 60°. The explanation for the improved performance in the case of an oblique crossing is the following: U- and I-plates are stacked in alternation in conventional transformer cores. In the location where the field lines cross over from the U to the I the next adjoining plate is a U, and the following plate again has an air gap in this location; i.e. half of the plates are part of a U here while the other half of the core consists of air gaps. Effectively, therefore, only half the transformer material is locally available. The field lines will want to use the adjoining solid pad as much as possible adjacent the air gap, so saturation will occur locally in the core material and no more field can pass through the soft iron. The remainder of the field lines will then cross via the air gap, which has a high magnetic resistance. This transition, accordingly, is responsible for the performance of the transformer core.

In a transformer core according to the invention, however, core laminations are used with two sub-parts comprising contact faces that are not perpendicular (as shown in FIG. 1), but that are oblique. As a result, √2 times more material is available at the area of an air gap where two sub-parts of a core lamination meet at an angle of 45°, which improves the efficiency or performance of the transformer core.

FIG. 4a is a perspective view showing how a transformer core according to the invention is assembled. On the one hand, sub-parts 27a and 28 having contact faces that are oblique relative to the centerline C of the kind described with reference to FIG. 2 are stacked in alternation and fastened together so as to form a pack (upper pack), see also the diagrammatic front elevation of FIG. 4b. On the other hand, sub-parts 27 and 28a of the kind described with reference to FIG. 2 are stacked in alternation and fastened together so as to form a pack (lower pack), see also the diagrammatic front elevation of FIG. 4b. The upper pack and the lower pack are pressed together in the direction of the arrow in FIG. 4b. The sub-parts 27 and 28 and the sub-parts 27a and 28a are self-centering during this. In the resulting final transformer core, the contact faces of mutually adjoining core plates, each consisting of two sub-parts, will cross two by two.

The general application of a transformer core according to the invention in a Coriolis tube will now be described with reference to FIG. 5.

A portion of a Coriolis tube 33 extends through the central opening 34 of the core 35 in this case. Said core is a transformer core with sub-parts having oblique contact faces according to the invention. An electric coil 36 forming a primary winding is wound on a leg of the core 35 and is connected to an AC source 37 for inducing an AC current in the Coriolis tube 33 which forms a secondary winding (FIG. 5). The Coriolis tube 33 here is a looped tube having a U-shape that is clamped in in two locations 38, 39.

FIG. 6a is a perspective view and FIG. 6b a diagrammatic front elevation of a modified version of a conventional E-I core with two openings 41, 42 and a central leg 43. Many transformers are constructed in this manner, with both the primary and the secondary windings being wound around the central leg of the E. These winding are often wound on a separate (square) coil former. The individual plates (sub-parts) for the E and the I are then laid alternately up and down in the coil former such that the transformer is created. In the modified version shown in FIG. 6 with the E in horizontal position, three pairs of oblique contact faces 44, 44a; 45, 45a; and 46, 46a between the E and the I are used. Two of these pairs are mutually parallel: the pair 45, 45a in the central leg 43 and the pair 44, 44a in one of the side legs. In the completed core the contact faces of adjoining core plates formed by two sub-parts cross two by two, as is diagrammatically depicted in FIG. 6b. The core 40 shown in FIG. 6a is suitable for use as a transformer core in general and for generating current in Coriolis sensing tubes, for example in that a primary electric coil is arranged around the central leg 43 of the core while the Coriolis tube forms a closed secondary loop (not shown) that is passed through both openings 41, 42. This has the advantage, in addition to the improved efficiency, inter alia that the core 40 can be readily disassembled for the purpose of removing windings and possibly modifying them.

FIG. 7 shows two alternative methods of dividing the laminations of a transformer core plate along oblique contact faces. FIG. 7*a* shows a division along oblique surfaces from the centers of the sides of the core opening 52 to the mutually opposed sides 53, 54 of the core plate or core lamination 55, resulting in two identical sub-parts 56, 57, and FIG. 7*b* shows a division along oblique surfaces from the corners of the core opening 58 to two corner points of the core plate or core lamination 59, resulting in a U-shaped sub-part 60 and an I-shaped sub-part 61.

FIG. 8 shows a special embodiment (to which the invention is not limited) of a flowmeter 1 of the Coriolis type with a looped sensing tube 2 bent into a U-shape that follows a substantially closed path (a substantially full turn). The looped sensing tube 2 comprises two parallel lateral tube portions 2*c*, 2*d* that are connected at one end to a first transverse tube portion 2*e* and at the other end to two second transverse tube portions 2*a* and 2*b*. The latter are connected to a—flexible—feed tube 3 and a—flexible—discharge tube 4 for a fluid medium at the side opposite to the respective sides where they are connected to the lateral tubes 2*c*, 2*d*. Preferably, the loop 2 and the feed and discharge tubes 3, 4 are part of the same tube. The tube 2 in its entirety is bent into a rectangular shape with rounded corners so as to make this shape possible at all. The feed tube 3 is connected via a feed and discharge block 20 to a feed line 6, and the discharge tube 4 is thus connected to a discharge line 7. The feed and discharge tubes 3, 4 in this embodiment extend within the loop 2 and are fastened to a frame 13 by fastening means 12. The flexible feed and discharge tubes 3, 4 do not form part of the loop shape of the sensing tube 2 but provide a flexible fastening of the loop 2 to the frame 13. The loop 2 may accordingly be regarded as being flexibly suspended by means of the feed and discharge tubes. The loop 2 and the feed and discharge tubes 3, 4 may advantageously be manufactured from one piece of tubing. This may be, for example, a stainless steel tube with an outer diameter of approximately 0.7 mm and a wall thickness of approximately 0.1 mm. Depending on the external dimensions of the loop 2 and the pressure the tube is to withstand (for example 100 bar), the outer diameter of the tube will generally be smaller than 1 mm and the wall thickness 0.2 mm or less.

The tubes 3 and 4, which extend close together on either side of and symmetrically with respect to the main axis of symmetry S of the tube 2, are fastened to the fastening means 12, for example by means of clamping, soldering or welding, said means in their turn being fastened to the frame 13. Alternatively, the tubes 3, 4 may be directly fastened to the frame 13.

Excitation means for causing the loop 2 to rotate about the main axis of symmetry (in this case the primary or excitation axis of rotation) in the construction of FIG. 8 comprise a magnetic yoke 8 with two air gaps 9 and 10 that is fastened to the frame 13 and is provided with a permanent magnet 19, portions 2*a* and 2*b* (denoted the second transverse tubes above) of the looped tube extending through said air gaps, and comprise means for introducing an electric current into the tube 2. These are means for generating current in the tube 2 by means of induction in FIG. 8. The permanently magnetic yoke 8 has two upper yoke parts 8*a* and 8*a*' that are separated from a lower yoke part 8*b* by the air gaps 9 and 10. The permanent magnet 19 is arranged between the yoke parts 8*a* and 8*a*' with its one (North) pole facing the yoke part 8*a* and its other (South) pole facing the yoke part 8*a*'.

Current is induced in the tube by means of two transformer cores 17, 17*a* which are provided with respective electric coils 18*a*, 18*b* and through which the respective lateral tube portions 2*c* and 2*d* extend. The transformer cores are of the type according to the invention having sub-parts with oblique contact faces. The coils 18*a*, 18*b* may be wound on the inner sides of the transformer cores, as shown, or on one of the other sides. The magnetic fields generated in the gaps 9 and 10 of the permanently magnetic yoke 8, which fields are transverse to the current direction and mutually oppositely directed, in combination with an (AC) current induced in the tube 2 result in a torque being applied to the tube owing to which said tube starts to rotate (in an oscillating manner) about the axis of rotation (vibration in the so-termed twist mode).

When a medium flows through the tube, the tube will oscillate about a response axis transverse to the axis of rotation under the influence of Coriolis forces (so-termed swing mode). During operation, the sinusoidal displacements of points of the tube portion 2*e*, which are representative of the flow, are detected by a Coriolis effect sensor which comprises a first sensor 11*a* arranged adjacent the tube portion 2*e* and a second sensor 11*b*. The first and the second sensor are arranged symmetrically on either side of the excitation axis of rotation close to the point of intersection thereof with the tube portion 2*e*. A third sensor 11*c* may serve for correction purposes. The sensors may be, for example, of an electromagnetic, inductive, capacitive, or ultrasonic type. In the embodiment of FIG. 8, however, optical sensors were chosen. The optical sensors used here were so-termed optoelectronic sensors 11*a*, 11*b*, 11*c* which each comprise a U-shaped housing fastened to the frame 13 and comprising a light source (for example an LED) in one leg of the U and in the other leg a light-measuring cell (for example a phototransistor) arranged opposite the light source. The tube portion 2*e*, or a vane fastened thereto, can move between the sensors 11*a*, 11*b* (and 11*c*, if present) on the legs of the U-shaped sensor housing and intercept more or less light of the light source.

FIGS. 1 to 7 all show embodiments that are symmetrical relative to the centerline in the plane of the core plate parallel to the direction in which the parts are joined together. The same effect of obtaining a larger effective diameter available for conducting the flux in combination with the self-centering effect can be achieved with embodiments that do not have this symmetry. FIGS. 9 to 11 show a few examples of this.

FIG. 9*a* shows an embodiment in which the oblique contact faces have the same direction in both legs of a core plate, i.e. are parallel. In the example shown, the contact faces p, q of the—identical—U-shaped sub-parts 62*a* and 62*b* are parallel. The advantage is that the entire transformer core can be built up from one type of sub-part. The sub-parts 62*a* and 62*b* together form a rectangular (square) core plate with a rectangular (square) opening. Adjoining the pair of sub-parts 62*a*, 62*b* there is an identical pair of sub-parts 63*a*, 63*b* that has been rotated through 180° with respect to the first pair.

FIG. 9*b* shows two stacks of alternately oriented sub-parts 62*a*, etc. that will form a rectangular (square) transformer core 63 according to the invention after being joined together.

FIG. 10*a* shows the use of a pair of identical L-shaped sub-parts 64*a*, 64*b* with contact faces p', q' that lie in one another's extended directions. An identical pair of sub-parts 65*a*, 65*b* rotated through 90° with respect to the pair 64*a*, 64*b* adjoins the latter. This embodiment has a substantially greater clamping length than the preceding embodiments.

FIG. 10*b* shows two stacks of sub-parts 64*a*, etc. in alternate orientation similar to FIG. 9*b*, which parts will form a rectangular (square) transformer core 66 according to the invention after being joined together. If the L-shaped sub-parts do not compose a square but a rectangle, the contact faces will be parallel.

FIG. 11a shows the use of two sub-parts 67a, 67b with oblique contact faces p", q" that fit one another. Unlike the embodiments described above, the embodiment is not symmetrical relative to the centerline of the core plate to be formed, and the sub-parts 67a, 67b are not identical because the extensions of the contact faces do not intersect on the centerline of the core plate to be formed. In other words: the contact faces do not intersect the core opening at the same level. The embodiment of FIG. 11a is merely an illustration of the many possible positions and angles of the contact faces (the dividing planes) of the sub-parts. It would even be possible to use different shapes for mutually adjoining core plates, with dividing lines in different locations The smallest diameter can be increased even further thereby.

FIG. 11b shows two stacks, similar to FIGS. 9b and 10b, of sub-parts 67a, etc. in alternate orientation which will form a rectangular (square) transformer core according to the invention after being fitted together.

The core plates shown in the preceding Figures all had a rectangular or square shape. The principle of the invention, however, is equally applicable to all other types of core plates, irrespective of their shapes, for example round, oval, quadrilateral, trapezoidal, or any closed shape whatsoever. Preferably, all these embodiments have a constant (rectangular) cross-section.

In this connection FIG. 12a shows an oval core plate 70 in front elevation with an oval opening, which plate 70 comprises two sub-parts 71, 72 that are joined together by oblique contact faces 71a, 72a and 71b, 72b (see FIG. 12b). An identical plate rotated through 180°, comprising sub-parts 73, 74, adjoins the plate 70, their contact faces being indicated with broken lines (FIG. 12a). In this embodiment the mutually complementary contact faces of the neighboring core plates do not cross each other (at the area of the core plates).

This configuration of contact faces may also be used for other types of core plates, rectangular, square, round, etc. The same holds for the following Figures.

FIG. 13a is a front elevation of a quadrilateral core plate 75 with an oblique division, and FIG. 13b is a perspective view of the assembly of a transformer core with such a core plate 76. Because of the quadrilateral shape, the adjoining plates here are always of a first and a second type with mutually complementary contact faces lying in different planes.

FIG. 14a is a front elevation of a core plate built up from two sub-parts having a random, i.e. irregular closed shape, but whose diameter is constant.

FIG. 14b shows the assembly of a transformer core from such plates. The mutually complementary contact faces of neighboring plates cross each other in this case (FIG. 14a).

Figure 4A:
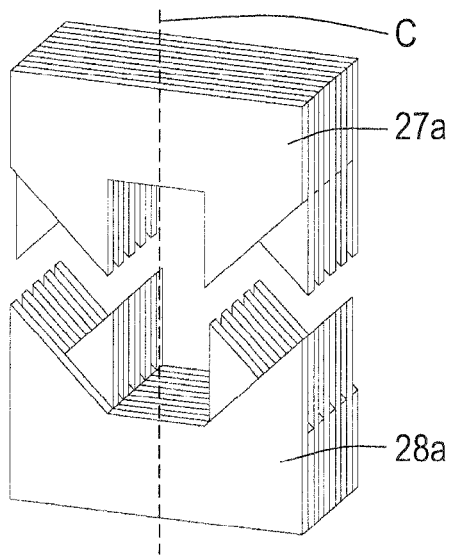
Figure 4B:
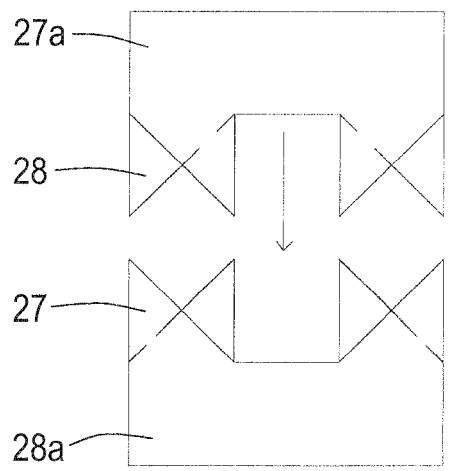
Figure 5:
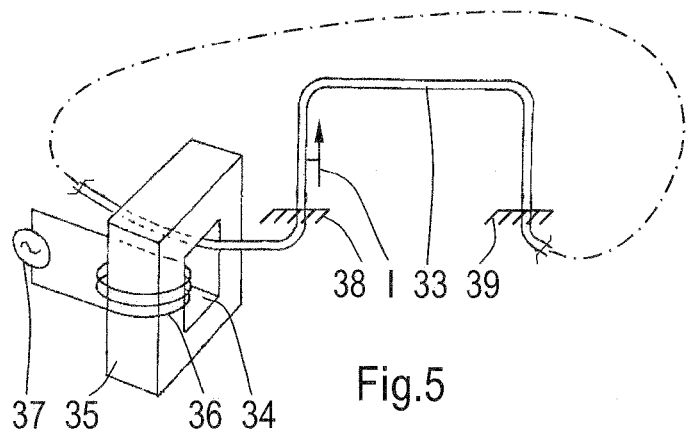
Figure 6A:
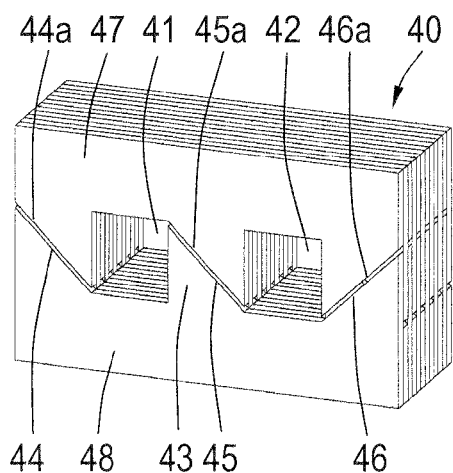
Figure 6B:
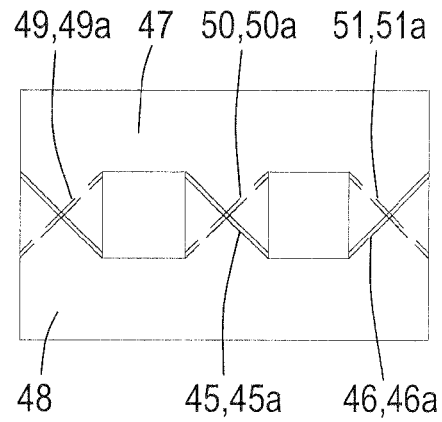
Figure 7A:
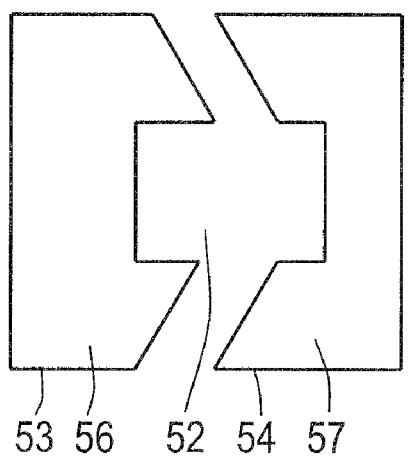
Figure 7B:
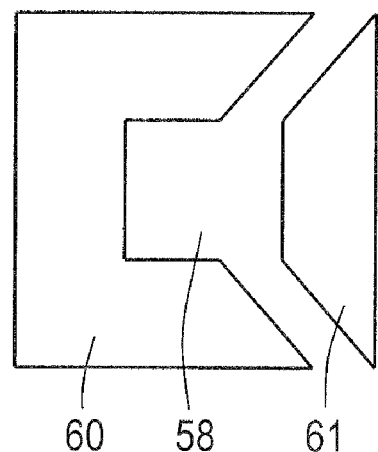
Figure 8:
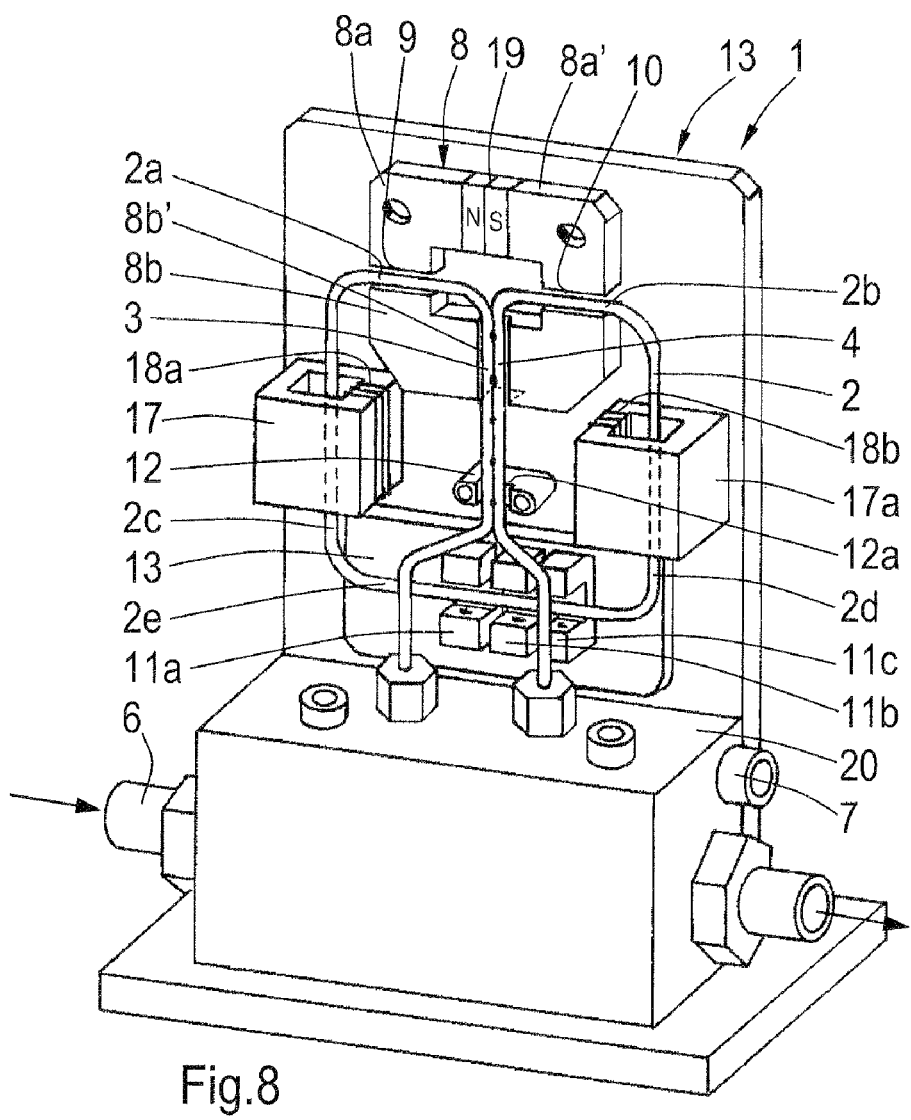
Figures 9A, 9B:
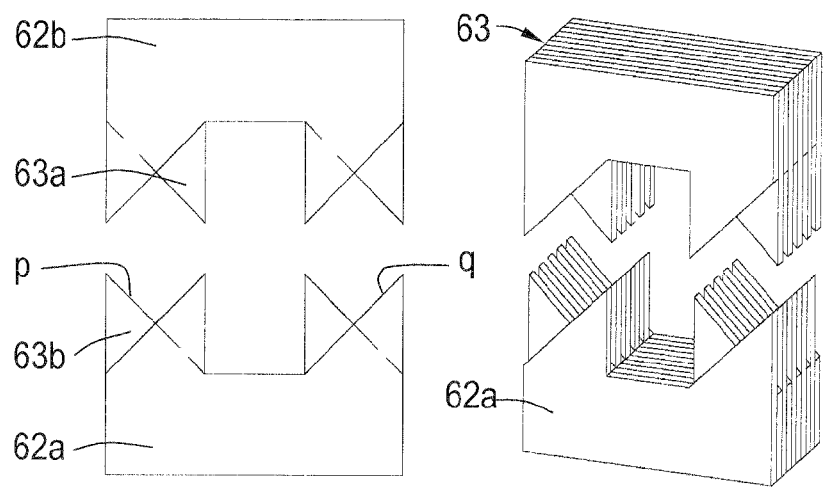
Figures 10A, 10B:
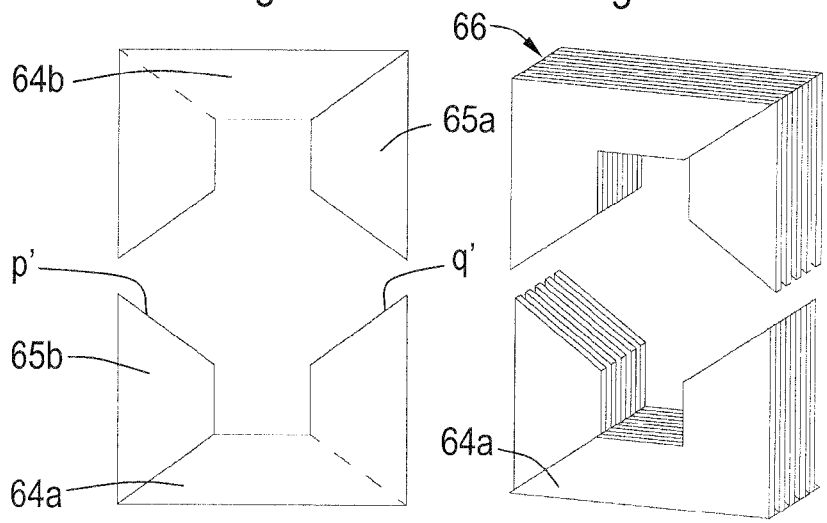
Figures 11A, 11B:
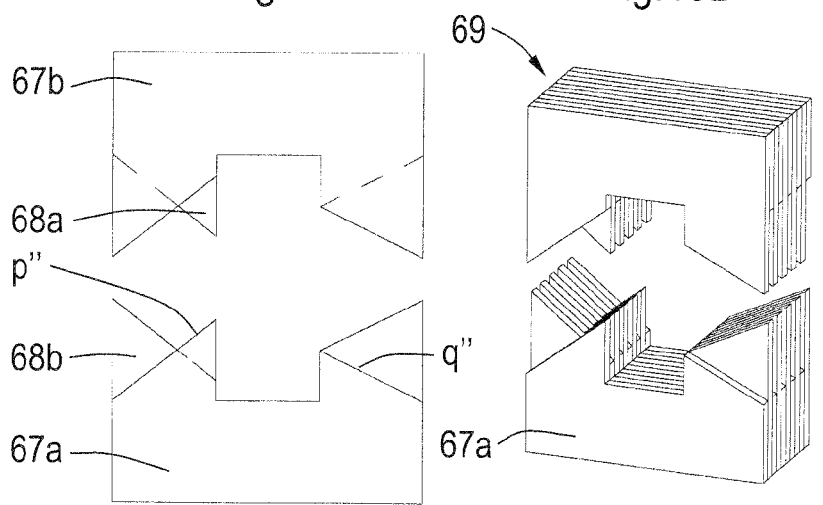

In summary, the invention relates to a transformer core comprising a stack formed from a number of planar core plates of a magnetically permeable material, each plate consisting of a first and a second sub-part which together enclose at least one opening. The sub-parts can be fitted together by means of contact faces that are located on either side of the opening and that extend obliquely with respect to the centerline of the core plate. The invention also relates to the use of the described transformer core in a Coriolis flowmeter with the Coriolis tube extending through the opening so as to induce a current in the tube.

More in particular, the transformer core consists of a stack of core parts in alternating orientation, which core parts each comprise two contraform U-shaped plates with contact faces oriented obliquely to the cross-section of the legs of the U.

The invention claimed is:

1. A transformer core comprising:
a first pair of planar sub-parts (27, 28) of magnetically permeable material that are joined together to form a rectangular core lamination (25) with a central rectangular opening (26) having four interior walls,
one of said first pair of planar sub-parts (27) being C-shaped and forming an entirety of three of the four interior walls (a, b, c) of the central rectangular opening, said one sub-part having two contact faces (32, 33) that contact the other of said pair of planar sub-parts, said contact faces extending obliquely relative to a centerline of said core lamination from two respective corners of the central rectangular opening to respective opposite peripheral side walls (35, 36) of said core lamination,
the other of said pair of planar sub-parts (28) forming the entire remaining one of the interior walls (d) of the central rectangular opening and having two contact faces (32a, 33a) that contact respective said contact faces of said one sub-part (27), said contact faces of said other sub-part extending obliquely relative to a centerline of said core lamination from said two respective corners of the central rectangular opening to respective opposite peripheral side walls (35, 36) of said core lamination; and
a second pair of planar sub-parts (27a, 28a) that are identical to said first pair of planar sub-parts and that are joined together to form a further said rectangular core lamination with a central rectangular opening,
wherein said second pair of planar sub-parts are directly adjacent to said first pair of planar sub-parts with the central rectangular openings thereof in registration and said second pair of planar sub-parts rotated 180° relative to said first pair, and
wherein a plurality of said adjacent first and second pairs of planar sub-parts are joined together to form said transformer core.

2. The transformer core as claimed in claim 1, wherein extensions of said contact faces of at least one of said first and second pairs of planar sub-parts intersect on the centerline of the respective said core lamination.

3. The transformer core as claimed in claim 1, wherein ones of said planar sub-parts bounding one side of the central rectangular opening are fastened together so as to form a first core half, and ones of said planar sub-parts bounding a side of the central rectangular opening opposite said one side are fastened together so as to form a second core half, and the first and the second core halves fit clampingly into one another.

4. The transformer core as claimed in claim 3, wherein the first and the second core halves fit clampingly into one another without additional fastening means.

* * * * *